(12) United States Patent
Wu et al.

(10) Patent No.: US 10,447,981 B2
(45) Date of Patent: Oct. 15, 2019

(54) ACTIVE ALIGNMENT EQUIPMENT AND ASSOCIATED METHOD FOR TESTING A PLURALITY OF PROJECTOR MODULES

(71) Applicant: HIMAX TECHNOLOGIES LIMITED, Tainan (TW)

(72) Inventors: Biing-Seng Wu, Tainan (TW); Yu-Feng Yen, Tainan (TW); Han-Yi Kuo, Tainan (TW); Yin-Dong Lu, Tainan (TW); Kuan-Ming Chen, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 15/860,682

(22) Filed: Jan. 3, 2018

(65) Prior Publication Data

US 2019/0068937 A1 Feb. 28, 2019

Related U.S. Application Data

(60) Provisional application No. 62/551,801, filed on Aug. 30, 2017.

(51) Int. Cl.
*H04N 17/04* (2006.01)
*H04N 9/31* (2006.01)

(52) U.S. Cl.
CPC ......... *H04N 9/3194* (2013.01); *H04N 9/3147* (2013.01)

(58) Field of Classification Search
CPC ..................................................... H04N 17/04
USPC .......................................................... 348/190
See application file for complete search history.

(56) References Cited

U.S. PATENT DOCUMENTS

| | | | |
|---|---|---|---|
| 6,727,864 B1* | 4/2004 | Johnson | G03B 21/13 345/1.3 |
| 2003/0137655 A1* | 7/2003 | Wegmann | G01M 11/0285 356/124 |
| 2008/0212838 A1* | 9/2008 | Frigerio | G06K 9/209 382/107 |
| 2012/0320042 A1* | 12/2012 | Green | G01J 3/506 345/419 |

FOREIGN PATENT DOCUMENTS

| | | |
|---|---|---|
| CN | 206459811 U | 9/2017 |
| JP | 2011-176629 A | 9/2011 |
| TW | I439788 B | 6/2014 |

* cited by examiner

*Primary Examiner* — Jefferey F Harold
*Assistant Examiner* — Sihar A Karwan
(74) *Attorney, Agent, or Firm* — Winston Hsu

(57) ABSTRACT

An equipment for testing a plurality of projector modules is provided, wherein the equipment includes a screen, a mask, at least one camera and a controller. The mask is positioned between the screen and the projector modules when the projector modules are within the equipment, and the mask is arranged to mask a plurality of projected images generated by the projector modules so that only a portion of projected images is allowed to be projected to the screen. The camera is arranged for capturing the portion of projected images on the screen. The controller is coupled to the camera, and is arranged for analyzing the captured images to control settings of the projector modules.

14 Claims, 6 Drawing Sheets

ACTIVE ALIGNMENT EQUIPMENT AND ASSOCIATED METHOD FOR TESTING A PLURALITY OF PROJECTOR MODULES

CROSS REFERENCE TO RELATED APPLICATIONS

This application claims the priority of U.S. Provisional Application No. 62/551,801, filed on Aug. 30, 2017, which is included herein by reference in its entirety.

BACKGROUND OF THE INVENTION

1. Field of the Invention

The present invention relates to an active alignment equipment and associated testing method.

2. Description of the Prior Art

In order to improve UPH (unit per hour), an active alignment equipment is expected to test more projector modules or camera modules at the same time. However, testing more projector modules at the same time means that the active alignment equipment needs a larger chamber, causing inconvenience to the production line in the factory.

SUMMARY OF THE INVENTION

It is therefore an objective of the present invention to provide an active alignment equipment, which has high UPH and low footprint, to solve the above-mentioned problems.

According to one embodiment of the present invention, an equipment for testing a plurality of projector modules is provided, wherein the equipment comprises a screen, a mask, at least one camera and a controller. The mask is positioned between the screen and the projector modules when the projector modules are within the equipment, and the mask is arranged to mask a plurality of projected images generated by the projector modules so that only a portion of projected images is allowed to be projected to the screen. The camera is arranged for capturing the portion of projected images on the screen. The controller is coupled to the camera, and is arranged for analyzing the captured images to control settings of the projector modules.

According to another embodiment of the present invention, a method for testing a plurality of projector modules is provided, wherein the method comprises the steps of: using a mask to mask a plurality of projected images generated by the projector modules so that only a portion of projected images is allowed to be projected to a screen; capturing the portion of projected images on the screen; and analyzing the captured images to control settings of the projector modules.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
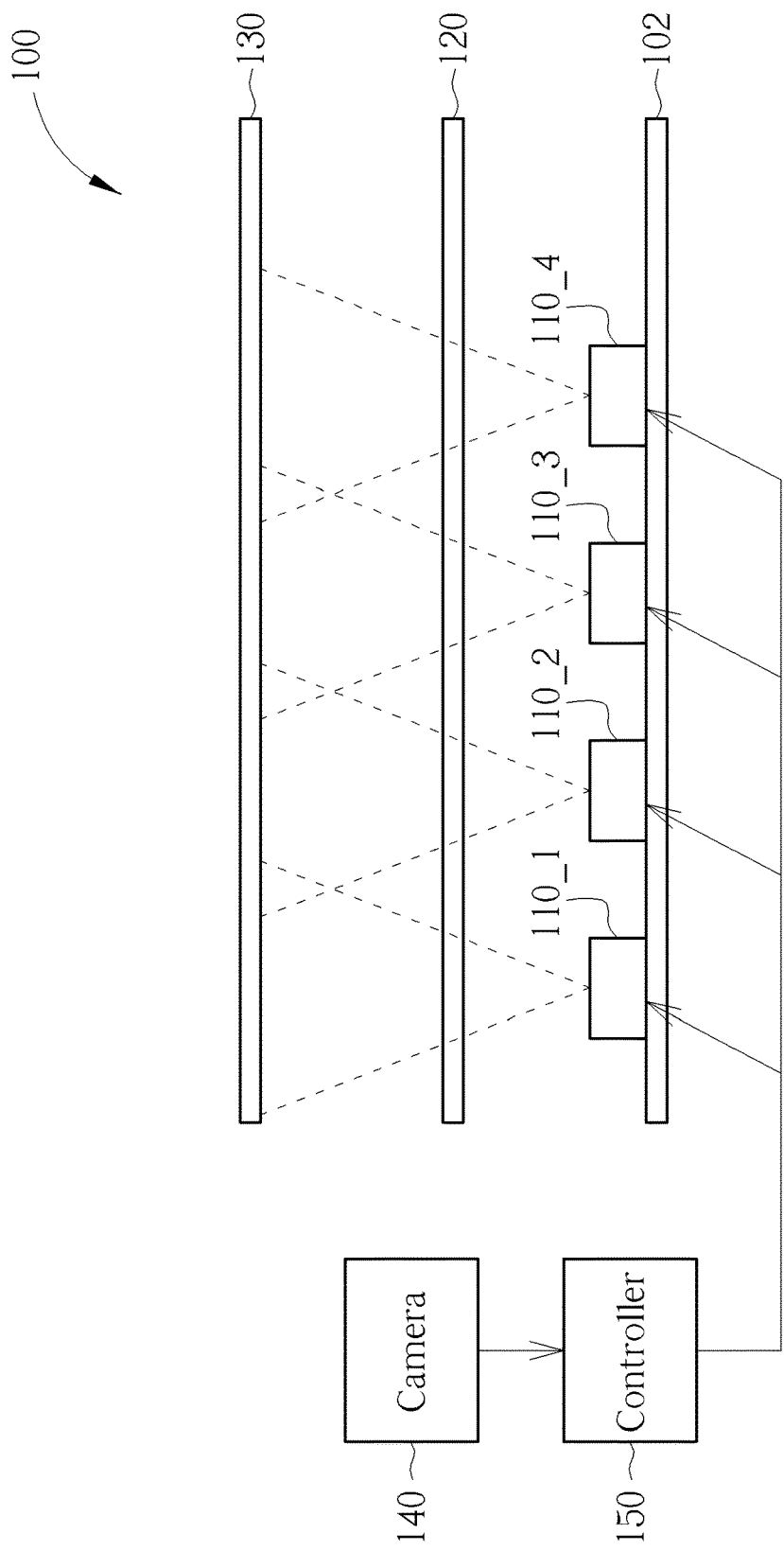
FIG. 1 is a diagram illustrating an active alignment equipment according to one embodiment of the present invention.

FIG. 1 is a diagram illustrating an active alignment equipment 100 according to one embodiment of the present invention. As shown in FIG. 1, the active alignment equipment 100 comprises a holder 102 for holding a plurality of projector modules (in this embodiment, there are four projector modules 110_1-110_4) to be tested, a mask 120, a screen 130, at least one camera 140 and a controller 150. The active alignment equipment 100 is used to test the projector modules 110_1-110_4 simultaneously, and the settings such as lens position and tilt adjustments of the projector modules 110_1-110_4 are automatically calibrated during the test.

In one embodiment, the camera 140 shown in FIG. 1 can be more than one cameras, and quantity of the cameras are the same as quantity of the projector modules, that is the active alignment equipment 100 may have four cameras. Each camera corresponds to one of the projector modules 110_1-110_4, and each camera is used to capture the projected image generated by the corresponding projector module. Then, the controller 150 analyzes each captured image to control the settings of the corresponding projector module.

In one embodiment, the controller 150 may comprise image processor and related circuits to analyze the captured images, and the controller 150 may comprises some mechanisms to move or adjust a lens module within the projector module. Because the present invention does not focus on the internal elements within the controller 150, further descriptions are omitted here.

In the operations of the active alignment equipment 100, the projector modules 110_1-110_4 are positioned into the active alignment equipment 100, and start to generate images to the screen 130 via the mask 120, wherein the mask 120 is used to mask the images projected by the projector modules 110_1-110_4 so that only a portion of the images are allowed to be projected to the screen 130. Then, the camera 140 captures the images on the screen 130, and the controller 150 receives the captured images and analyzes the captured images to determine if each of the images projected by the projector modules 110_1-110_4 has a quality or focus issue (e.g. the image is blurred) or a tilt issue (e.g. a corner of the image is not a right angle), and the controller 150 further controls the setting of the projector modules 110_1-110_4 according to the determined results to solve these problems.

In the embodiment shown in FIG. 1, in order to reduce the footprint of the active alignment equipment 100, the projector modules 110_1-110_4 are positioned closer so that the projected images on the screen 130 may be overlapped. However, the overlapped projected images may cause errors to the image analysis performed by the controller 150. Therefore, the embodiment of the present invention provides the mask 120 to mask the projected images, and only a portion of each projected image is allowed to be on the screen 130, to solve the aforementioned image overlapping problem.

Figure 2:
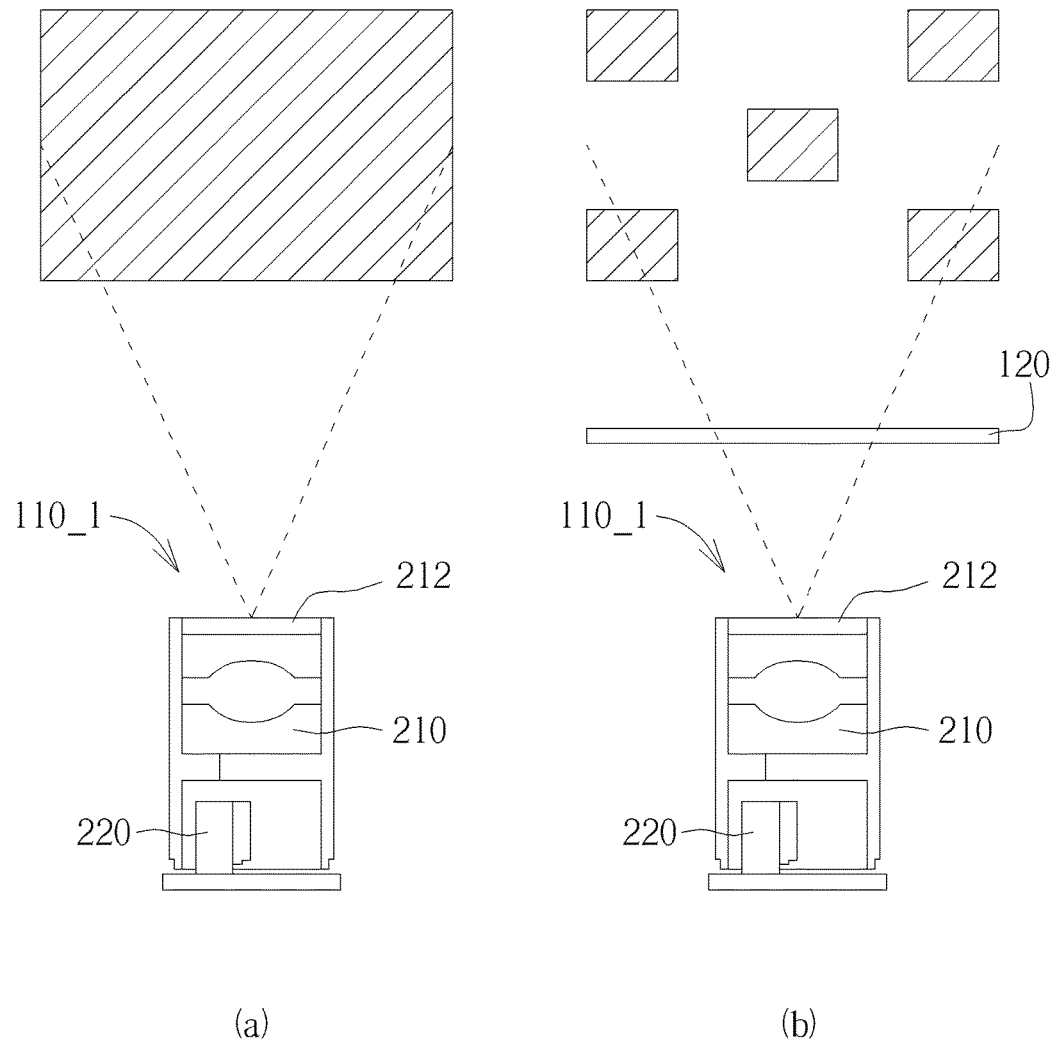
FIG. 2 is a diagram illustrating one projector module and the projected images if the mask is used or not according to one embodiment of the present invention.

Specifically, refer to FIG. 2 first, which is a diagram illustrating one projector module and the projected images if the mask 120 is used or not according to one embodiment of the present invention. As shown in FIG. 2, the projector module such as 110_1 comprises at least a lens module 210 and a laser module 220, wherein a diffractive optical element (DOE) 212 is imprinted on a substrate of the lens module 210. The laser module 220 is used to generate a laser beam, and particularly, the laser beam is an infrared light. The lens module 210 is arranged to receive the laser beam from the laser module 110 to generate a collimated laser beam. The DOE 212 can serve as a pattern generator, and the collimated laser beam passes through the DOE 212 to generate a projected image, where the projected image may have a special pattern set by the DOE 212. FIG. 2(a) shows a projected image generated by the projector module 110_1 if no mask 120 is used, where the projected image is rectangular image. FIG. 2(b) shows a projected image generated by the projector module 110_1 if the mask 120 is positioned between the projector module 110_1 and the screen 130, where only four corners and a center region of the projected image are on the screen 130, and the remaining portion is masked by the mask 120.

Figure 3:
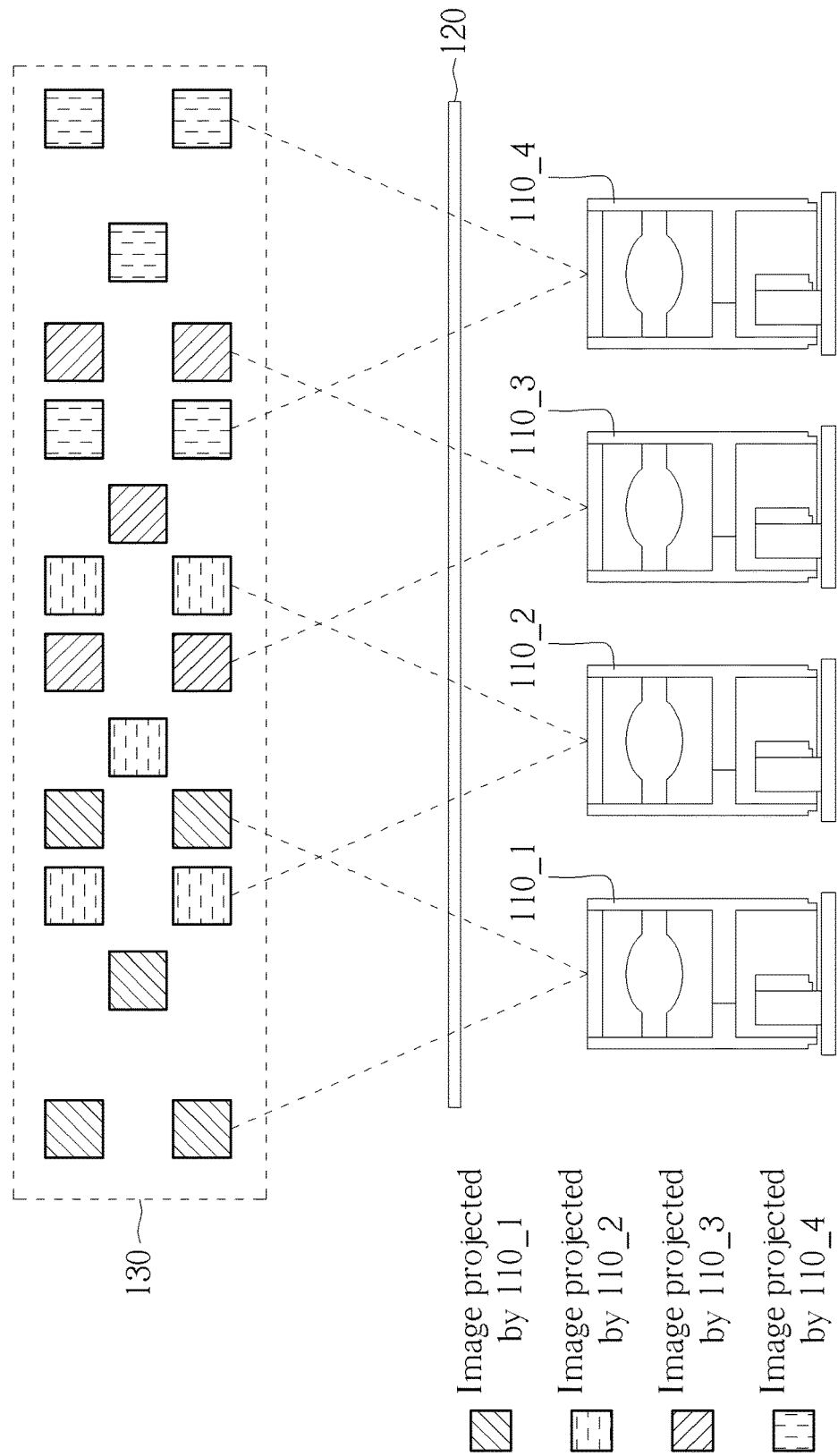
FIG. 3 shows the patterns on the screen according to one embodiment of the present invention.

Refer to FIG. 3, which shows the patterns on the screen 130 according to one embodiment of the present invention. As shown in FIG. 3, for each of the projected image, only the four corners and the center region can be projected to the screen 130, and the projected images generated by two adjacent projector modules are interleaved. Specifically, the left two corner of the projected image generated by the projector module 110_2 is between the center region and the right two corners of the projector module 110_1, the right two corners of the projector module 110_1 is between the center region and the left two corners of the projector module 110_2, the left two corner of the projected image generated by the projector module 110_3 is between the center region and the right two corners of the projector module 110_2, and the right two corners of the projector module 110_2 is between the center region and the left two corners of the projector module 110_3, and so on. In the embodiment shown in FIG. 3, because the projected images are interleaved, the overall length of patterns on the screen 130 can be reduced, that is the size of the screen 130 and the size of the active alignment equipment 100 can be reduced. Therefore, the active alignment equipment 100 having smaller size/footprint is more convenient for the use in the production line in the factory.

In addition, because the four corners and the center region of each projected image are on the screen 130, and two different projected images are not overlapped, the controller 150 can accurately determine the focus and tilt condition of each of the projector modules 110_1-110_4, even if the other portions of the projected images are masked by the mask 120.

Figure 4:
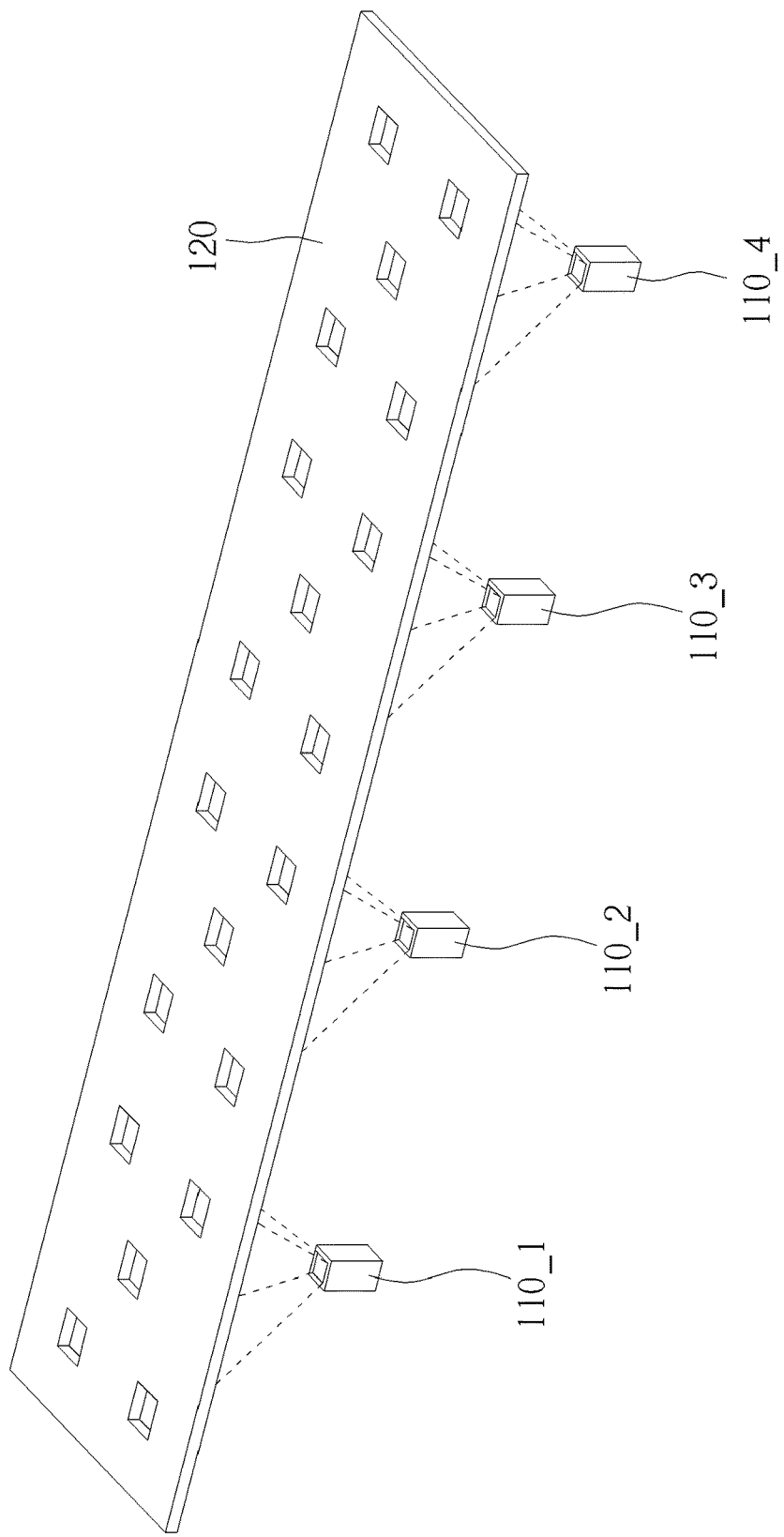
FIG. 4 is a diagram illustrating the mask according to one embodiment of the present invention.

FIG. 4 is a diagram illustrating the mask 120 according to one embodiment of the present invention. As shown in FIG. 4, the mask 120 can be implemented by a plate having a plurality of holes for allowing the portion of the projected images passing through. The plate can be made by any suitable material such as metal or plastic.

Figure 5:
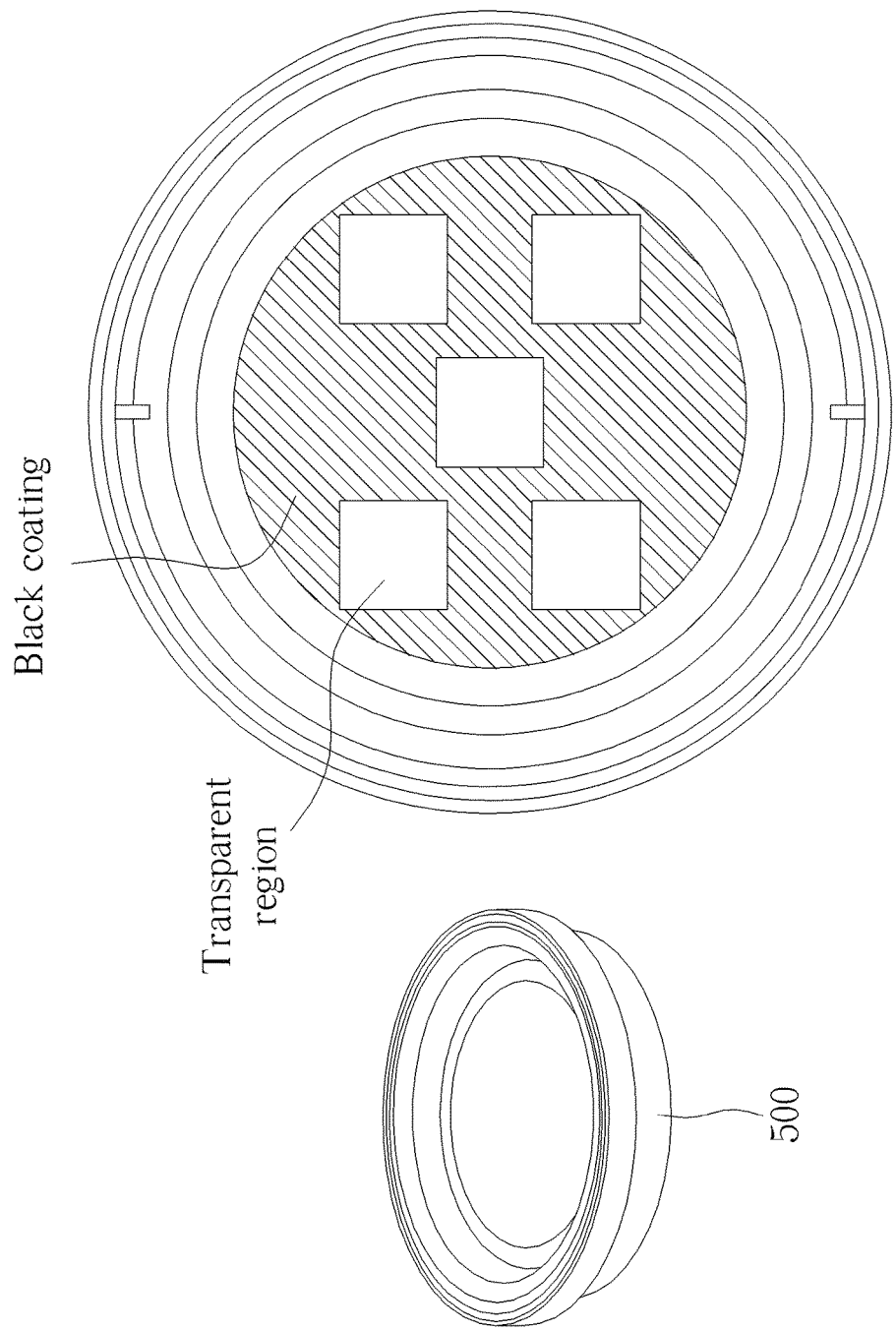
FIG. 5 is a diagram illustrating the mask according to another embodiment of the present invention.

FIG. 5 is a diagram illustrating the mask 120 according to another embodiment of the present invention. As shown in FIG. 5, the mask 120 can be implemented by four relay lens 500 (one relay lens 500 is positioned in front of one projector module), and each relay lens 500 comprises a glass substrate having black coating or dark costing and a plurality of transparent regions, wherein the transparent regions are used to let the four corners and the center region of the projected image to pass through.

It is noted that the projected images shown in FIG. 3 and the mask 120 shown in FIG. 4 or FIG. 5 are for illustrative purposes only, and not a limitation of the present invention. As long as the projected image generated by each of the projector modules 110_1-110_4 comprises four corners and the center region, and the projected images generated by different projector modules are not overlapped, quantity or shape of the holes of the mask 120 shown in FIG. 4 and the quantity or shape of the transparent regions of the relay lens 500 shown in FIG. 5 may have different designs. These alternative designs shall fall within the scope of the present invention.

Figure 6:
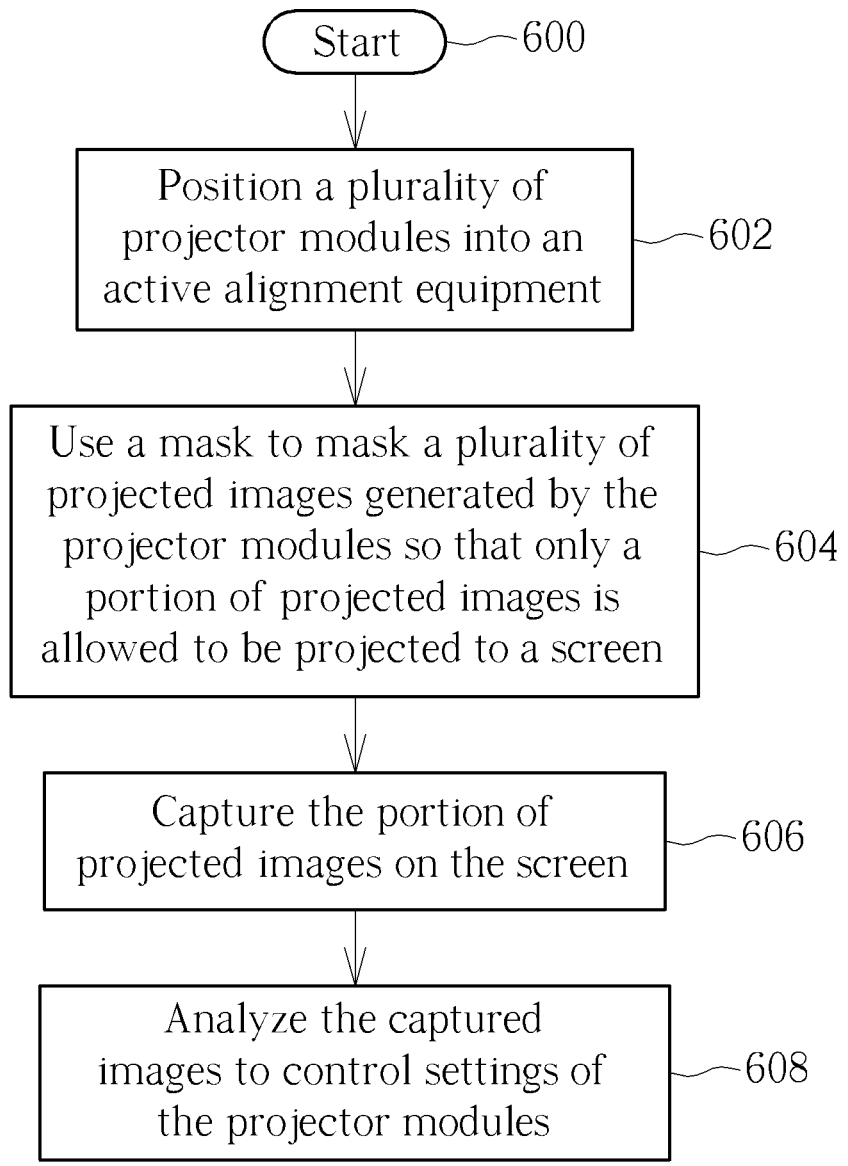
FIG. 6 is a flowchart of a method for testing a plurality of projector modules according to one embodiment of the present invention.

FIG. 6 is a flowchart of a method for testing a plurality of projector modules according to one embodiment of the present invention. Refer to FIGS. 1-6 and the above disclosure, the flow is as follows.

Step 600: the test starts.

Step 602: position a plurality of projector modules into an active alignment equipment.

Step 604: use a mask to mask a plurality of projected images generated by the projector modules so that only a portion of projected images is allowed to be projected to a screen.

Step 606: capture the portion of projected images on the screen.

Step 608: analyze the captured images to control settings of the projector modules.

Briefly summarized, in the active alignment equipment of the present invention, by using the mask of the embodiment, the projected images generated by projector modules are interleaved and not overlapped, so the active alignment equipment can be designed to have smaller size. Hence, the active alignment equipment of the present invention can have high UPH and low footprint.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An equipment for testing a plurality of projector modules, comprising:
  a screen;
  a mask, positioned between the screen and the projector modules when the projector modules are within the equipment, wherein the mask is arranged to mask a plurality of projected images generated by the projector modules so that only a portion of projected images is allowed to be projected to the screen;
  at least one camera, for capturing the portion of projected images on the screen; and
  a controller, coupled to the camera, for analyzing the captured images to control settings of the projector modules;
  wherein the projector modules comprise a first project module and a second project module for generating a first projected image and a second projected image, respectively, only a portion of the first projected image passes through the mask to the screen, and only a portion of the second projected image passes through the mask to the screen;

wherein the portion of the first projected image and the portion of the second projected image on the screen are interleaved, the portion of the first projected image comprises a first portion and a second portion, the portion of the second projected image comprises a third portion and a fourth portion, the second portion is between the first portion and the third portion, and the third portion is between the second portion and the fourth portion; and the first portion, the second portion, the third portion and the fourth portion on the screen are not overlapped.

2. An equipment for testing a plurality of projector modules, comprising:
a screen;
a mask, positioned between the screen and the projector modules when the projector modules are within the equipment, wherein the mask is arranged to mask a plurality of projected images generated by the projector modules so that only a portion of projected images is allowed to be projected to the screen;
at least one camera, for capturing the portion of projected images on the screen; and
a controller, coupled to the camera, for analyzing the captured images to control settings of the projector modules;
wherein the projector modules comprise a first project module and a second project module for generating a first projected image and a second projected image, respectively, only a portion of the first projected image passes through the mask to the screen, and only a portion of the second projected image passes through the mask to the screen;
wherein the first projected image is a rectangular image, and the portion of the first projected image comprises at least four corners of the first projected image, and contents between every two of the corners of the first projected image are not displayed on the screen.

3. The equipment of claim 2, wherein the portion of the first projected image further comprises a center region of the first projected image.

4. The equipment of claim 3, wherein the second projected image is a rectangular image, the portion of the second projected image comprises four corners and a center region of the second projected image, and two of the corners of the second projected image are between the center region and two of the corners of the first projected image.

5. The equipment of claim 1, wherein the mask is a plate having a plurality of holes for allowing the portion of the projected images to pass through.

6. The equipment of claim 1, wherein the mask comprises a glass having non-transparent coating for masking the projected images.

7. The equipment of claim 1, wherein the controller analyzes the captured images to control the settings of the projector modules simultaneously.

8. A method for testing a plurality of projector modules, comprising:
using a mask to mask a plurality of projected images generated by the projector modules so that only a portion of projected images is allowed to be projected to a screen;
capturing the portion of projected images on the screen; and
analyzing the captured images to control settings of the projector modules;
wherein the projector modules comprise a first project module and a second project module for generating a first projected image and a second projected image, respectively, only a portion of the first projected image passes through the mask to the screen, and only a portion of the second projected image passes through the mask to the screen;
wherein the portion of the first projected image and the portion of the second projected image on the screen are interleaved, the portion of the first projected image comprises a first portion and a second portion, the portion of the second projected image comprises a third portion and a fourth portion, the second portion is between the first portion and the third portion, and the third portion is between the second portion and the fourth portion; and the first portion, the second portion, the third portion and the fourth portion on the screen are not overlapped.

9. A method for testing a plurality of projector modules, comprising:
using a mask to mask a plurality of projected images generated by the projector modules so that only a portion of projected images is allowed to be projected to a screen;
capturing the portion of projected images on the screen; and
analyzing the captured images to control settings of the projector modules;
wherein the projector modules comprise a first project module and a second project module for generating a first projected image and a second projected image, respectively, only a portion of the first projected image passes through the mask to the screen, and only a portion of the second projected image passes through the mask to the screen;
wherein the first projected image is a rectangular image, and the portion of the first projected image comprises at least four corners of the first projected image, and contents between every two of the corners of the first projected image are not displayed on the screen.

10. The method of claim 9, wherein the portion of the first projected image further comprises a center region of the first projected image.

11. The method of claim 10, wherein the second projected image is a rectangular image, the portion of the second projected image comprises four corners and a center region of the second projected image, and two of the corners of the second projected image are between the center region and two of the corners of the first projected image.

12. The method of claim 8, wherein the mask is a plate having a plurality of holes for allowing the portion of the projected images to pass through.

13. The method of claim 8, wherein the mask comprises a glass having non-transparent coating for masking the projected images.

14. The method of claim 8, wherein the step of analyzing the captured images to control the settings of the projector modules comprises:
analyzing the captured images to control the settings of the projector modules simultaneously.

* * * * *